Aug. 1, 1967

R. REYNOLDS 3,334,206

CONTROL MEANS FOR WATER DISTRIBUTION APPARATUS

Filed June 27, 1966

INVENTOR.
Richard Reynolds
BY
Peck & Peck
ATTORNEYS 3,334,206
CONTROL MEANS FOR WATER DISTRIBUTION
APPARATUS
Richard Reynolds, 4430 Spaulding Ave. SE.,
Washington, D.C. 20023
Filed June 27, 1966, Ser. No. 560,563
4 Claims. (Cl. 200—140)

ABSTRACT OF THE DISCLOSURE

A control apparatus for causing a water sprinkler to operate when the ground is warm and dry, and to cease operation when the ground is cool and moist. A container filled with an expansible gas is buried in the ground. A mechanism is activated by the expanding gas to close a switch to operate the sprinkler, and is to open the switch when the gas is contracting to stop operation of the sprinkler.

---

This invention relates broadly to means which operate automatically to control the operation of electrically controlled sprinkler systems, and in its more specific aspects it relates to such apparatus which is automatic in its operation, the operation thereof being controlled by the temperature of the earth or other medium with which a component thereof is in thermal contact; and the nature and objects of the invention will be readily recognized and understood by those skilled in the arts to which it relates in the light of the following explanation and detailed description of the accompanying drawings illustrating what I at present believe to be preferred embodiments or mechanical expressions of my invention from among various other forms, arrangements, combinations and constructions, of which the invention is capable within the spirit and scope thereof.

This invention constitutes an improvement of my Patent No. 2,318,969 which issued on May 11, 1943, for Water Distribution Apparatus. While the apparatus disclosed in this prior patent has operated successfully in functioning to water, by sprinkler system, areas of ground, my experience has indicated that at times the apparatus disclosed in this prior patent will operate unnecessarily when the ground is wet or damp and actually does not need additional watering. The reason for this inherent characteristic of the apparatus disclosed in my aforesaid patent, is that it is automatic in its operation and such operation is predetermined by a timing mechanism so that the sprinkler goes on at times which are set, regardless of the condition of the earth being sprinkled thereby.

In a very simple and inexpensive manner I have devised a control apparatus which may be combined with the apparatus of my Patent No. 2,318,969, such improvement providing full and complete control over the operation of the apparatus of the patent, or of any type of sprinkler system, so that the very successful apparatus of my aforesaid patent will only be actuated when the soil to be watered thereby, is dry and requires water, and the apparatus will not operate when the soil is wet or damp and does not need any additional watering.

In developing this improvement I have recognized and made use of the characteristic of gases whose conditions change under varying thermal states. Gases expand under heat conditions while they contract under cold conditions. I have also taken cognizance of the fact that dry earth is warmer than wet, damp or moist earth. Thus, I have taken these two factors into consideration in developing this invention, and have made use of this expansion and contraction characteristic of gases under different thermal conditions, and the different thermal condition of wet and dry earth.

These two characteristics of gases under varying thermal conditions, and the thermal characteristics of relatively wet and dry earth, forms the gravamen of my invention, for I employ a non-toxic gas which will expand when in thermal contact with relatively warm material and will contract when in thermal contact with a relatively cold material, and I have provided an arrangement wherein a container filled with such gas is in thermal contact with the earth so that it will expand when the earth is relatively warm because it is relatively dry and will contract when the earth is relatively cold because it is relatively wet.

I have combined with this expansible and contractible gas which is in thermal contact with the earth, means which is activated and controlled by the expanding or contracting gas to open and close an electric circuit which in turn opens and closes the electric circuit to the apparatus of my Patent No. 2,318,969, or of any other electrically controlled sprinkler system.

It is to be fully recognized that my control apparatus may be combined with any sprinkler system, and my mention of my prior patent is merely by way of example, and I do not intend to thereby limit this improvement solely for use with the apparatus disclosed in Patent No. 2,318,969.

It has been one of my purposes in evolving this invention to provide a simple, inexpensive and efficient control means, which under normal use conditions will require little or no maintenance.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings.

Figure 1:
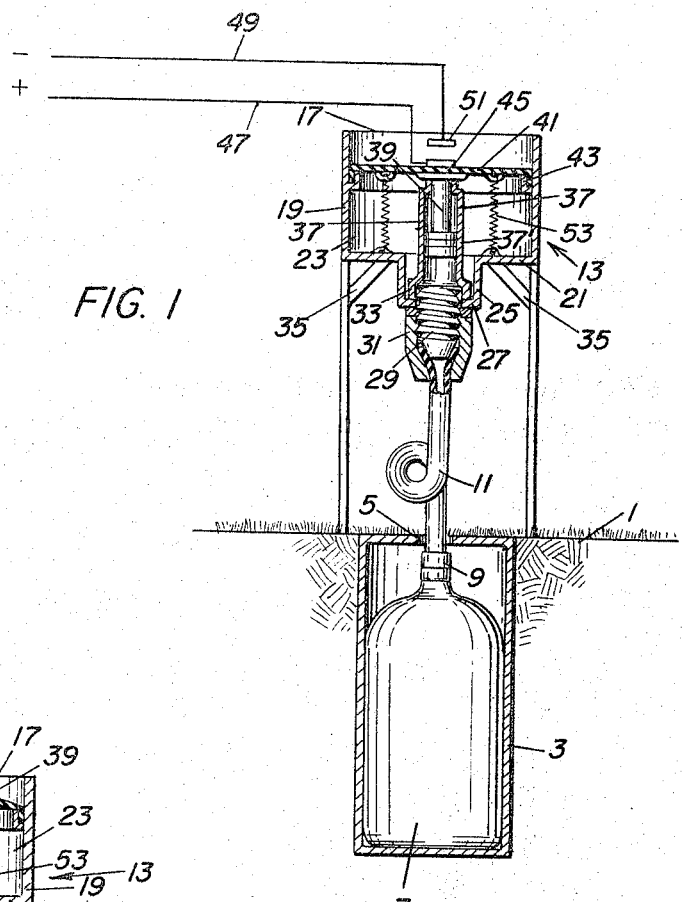
FIG. 1 is a view in elevation, with parts thereof in section, illustrating the switch of the control means in open position.
Figure 2:
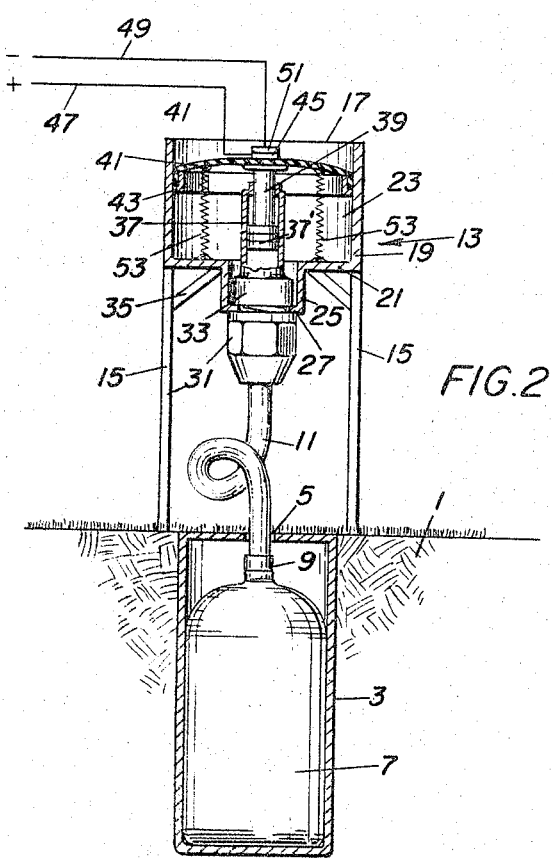
FIG. 2 is a view, similar to FIG. 1, but illustrating the switch of the control means in closed position.

In the accompanying drawings, I have used the numeral 1 to designate the ground in which a component of my control means for sprinkler system is buried and in thermal contact therewith. I sink or bury a housing or casing 3 within the ground, the housing 3 may be rectangular, cylindrical or of any other configuration believed to be the most suitable by one practising my invention. The housing is formed of any suitable metal having good thermal transfer characteristics, is completely closed, except at its upper end, where an opening 5 is provided, the purpose of which will be hereinafter explained. Consideration of the drawings clearly indicates that the housing is in thermal contact with the ground so that the thermal condition of the ground will be transmitted to the housing.

Positioned within the housing 3 is a soft metal gas carrying bulb 7, which has a sliding fit within the housing, so that it may be removed when required, and a new one inserted. However, the walls of the bulb are in close thermal contact with the walls of the housing so that a sound and good thermal path from the ground, to the housing and the bulb is provided. The bulb 7 is filled with any suitable non-toxic gas, which may be Freon, and the expansion and contraction characteristics of the gas are used to operate and control the sprinkler system. Gases expand under heat and contract under cold, so that any safe, non-toxic gas may be used in my apparatus. The gas carrying bulb 7 is formed with an open upper neck 9, in which is removably fixed, in any suitable manner, a pipe or tube 11, which is preferably, though not necessarily, flexible, and is formed of a material which is unaffected by the gas which is within the bulb 7.

Mounted on the ground 1, preferably in position above the buried housing and bulb is a switch supporting platform, designated in its entirety by the numeral 13. The platform 13 is supported on legs 15, or if desired, and found suitable, instead of being supported on legs, the switch supporting platform 13, may be supported on the top of an elongated enclosed supporting structure. The switch supporting platform 13, which is mounted on top of the legs 15, or the enclosed elongated structure, is provided with a top closure 17, walls 19, and a continuous inwardly extending ledge, shelf, or the like, 21, which is downwardly spaced from the top 17, providing an enclosed area 23 between the top and the ledge. At its center the ledge 21 if formed with a downwardly depending wall 25, on the lower end of which is provided an inwardly extending lip or flange 27. Adjacent to but downwardly spaced from its upper end, the tube or pipe 11 is formed with external threads 29, toward which the flange 27 extends. I provide a pair of lock nuts 31 and 33, which are threaded on the threading 29, which the flange 27 therebetween. In this manner the tube 11 is properly positioned and the ledge 21 is provided with a degree of reinforcement. I may also provide supporting brackets 35 for the ledge and the supporting platform 13.

With the gas conducting pipe 11 positioned within the mouth or neck 9 of the gas carrying bulb 7, it extends upwardly and into the switch supporting platform 13, between the flanges 27, and fixed in position by means of the lock nuts 31 and 33. Positioned within the upper, and preferably enlarged end, portion 37 of the tube or pipe 11, which portion is within the area 23, is a piston 37' which is operable within the portion 37 of the tube. A piston rod 39 is fixed on the upper end of the piston and extends through an opening in the upper end of the tube 11, and outwardly therebeyond.

Fixed, in any suitable manner, on the upper end of the piston rod 39 is a flexible, deformable diaphragm 41, which may be formed of rubber, or any other suitable and desirable material. The periphery of the diaphragm fixedly extends into a retaining ring 43 which is fixed to the wall 19 of the switch supporting platform 13.

One contact 45 of an electric switch is fixed on the upper surface of the diaphragm. One lead 47 of the power source to the sprinkler system being connected to the contact 45. I provide the other lead 49 which, like lead 47, extends through the top 17, and the other contact 51 of the electric switch is connected to the lead 49. The contact 51 being mounted in any suitable manner directly above the contact 45.

When ground is wet, damp or moist it is relatively cool or cold, while, when it is dry it is relatively warm. When the bulb 7 is mounted in the housing 3, which is buried in the ground, and the bulb is filled with the switch actuating gas, it will be recognized that when the ground is dry it will be relatively warm, and this temperature will be transmitted through the housing and the bulb to the gas contained therein, and the gas will expand and move up the tube or pipe 11 to force the piston 37' upwardly, with a consequent upward arching, or deformation, of the diaphragm 41 until electric contact 45 contacts contact 51 to close the circuit to the sprinkler system through leads 47 and 49, so that the sprinkler system will be turned on and the ground area sprinkled.

When the ground area is sufficiently wetted the ground will become relatively cool and this lowering of the temperature of the ground will be transmitted to the gas within the bulb, with a resultant contraction of the gas under the cooler temperature. When this gas contraction occurs the gas will be withdrawn from the tube 11, the piston and piston rod lowered, and the diaphragm will return to its normal non-arched position, under the action of the springs 53. Thus, the electric contact between contacts 45 and 51 will be broken and operating power for the sprinkler system cut off, so that further sprinkling will not occur, until the ground again becomes dry and relatively warm.

It is to be understood that it is within my contemplation to mount and support the switch means in any suitable manner, and the example here given, is merely by way of example, and is not to be construed as a limitation.

I claim:

1. Control means for water distribution apparatus, including means sensitive to the thermal condition of the earth, said means adapted to be in thermal contact with the earth for thermal transfer between the earth and said means, and said means being expansible under warm earth condition and contractible under cold earth condition, and said means comprises a gas, a container for said gas, a tube in communication with said container for receiving the gas therefrom when it expands under warm earth condition, an electric circuit, a housing, an electric switch means mounted in said housing and in communication with said tube and actuable by the gas pressure therein, and said electric switch means including a deformable member mounted in said housing and having a movable switch contact thereon connected in said electric circuit, a fixed switch contact connected in said electric circuit and spaced from said first mentioned switch contact, and in the normal position of said deformable member said movable switch contact thereon being removed from said fixed switch contact, and when said member is deformed said movable switch contact thereon being in engagement with said fixed switch contact, a piston rod fixed to said deformable member, a piston fixed to said piston rod and operatively mounted in said tube for actuation by said gas pressure to actuate said piston rod and deform said movable switch contact into electric contact with said fixed switch contact to close the electric circuit, means responsive to the closing of the electric circuit to operate said water distribution apparatus, and said deformable member being returned to normal condition to open the electric circuit when the earth is cold.

2. Control means for water distribution apparatus, including means sensitive to the thermal condition of the earth, said means adapted to be in thermal contact with the earth for thermal transfer between the earth and said means, and said means being expansible under warm earth condition and contractible under cold earth condition, an electric circuit, a housing, an electric switch means mounted in said housing and in communication with said means, said electric switch means including a deformable member mounted in said housing and having a movable switch contact thereon connected in said electric circuit, a fixed switch contact connected in said electric circuit and spaced from said movable switch contact, and piston means engaging said deformable member to deform said member under the pressure of said means when it expands to bring said movable switch contact into electric contact with said fixed switch contact to close the electric circuit, means responsive to the closing of the electric circuit to operate said water distribution apparatus, and further means to return said deformable member to switch open position when said gas contracts under cold earth condition to open the electric circuit.

3. Control means for water distribution apparatus, including means sensitive to the thermal condition of the earth, said means adapted to be in thermal contact with the earth for thermal transfer between the earth and said means, and said means being expansible under warm earth condition and contractible under cold earth condition, an electric circuit, electric switch means connected in said electric circuit and with said means and actuated thereby to close the circuit, said switch means comprising a deformable member, a piston movable in response to the expansion of said means to deform said deformable member to close said switch, and means for returning said deformable member to open said switch upon contraction of said earth means, means responsive to the closing of the electric circuit to operate the water distribution apparatus when the earth is warm, and being actuated to open said electric circuit when the earth is cold, said means being contained in a container formed of a material having good thermal transfer characteristics, and said container being inserted in a casing formed of a material having good thermal transfer characteristics, said container and casing being in thermal transfer contact, and said casing adapted to be sunk in the ground.

4. Control means in accordance with claim 3, wherein said container is formed of a soft metal material and said container has a sliding fit with said casing.

References Cited

UNITED STATES PATENTS

| 2,032,041 | 2/1936 | Beck | 200—140 |
| 2,785,006 | 3/1957 | Young et al. | 239—63 |
| 2,985,732 | 5/1961 | Russell | 200—82 |
| 3,270,460 | 9/1966 | Wild | 239—63 |

FOREIGN PATENTS

| 830,728 | 3/1960 | Great Britain. |

BERNARD A. GILHEANY, *Primary Examiner.*

H. B. GILSON, *Assistant Examiner.*